United States Patent
Blum et al.

[15] 3,638,934
[45] Feb. 1, 1972

[54] PRECISION POSITIONING TOOL

[72] Inventors: James Blum, Pasadena, Calif.; Robert P. Johnson, Pontiac, Mich.

[73] Assignee: Bell & Howell Company, Chicago, Ill.

[22] Filed: Mar. 3, 1970

[21] Appl. No.: 18,807

Related U.S. Application Data

[62] Division of Ser. No. 680,830, Nov. 6, 1967, Pat. No. 3,575,366.

[52] U.S. Cl. ............................................. 269/311, 29/530
[51] Int. Cl. ......................................................... B23q 3/18
[58] Field of Search ................... 259/53, 54, 292, 309, 311, 259/321 A; 77/58; 90/11, 11.1; 29/527.6, 530; 83/13, 698

[56] References Cited

UNITED STATES PATENTS

| | | | |
|---|---|---|---|
| 2,624,107 | 1/1953 | Carpenter | 269/309 X |
| 2,955,820 | 10/1960 | Berg | 269/54 |
| 3,264,941 | 8/1966 | Miraglia | 29/530 X |
| 3,526,397 | 9/1970 | Verguson | 269/319 |

*Primary Examiner*—Andrew R. Juhasz
*Attorney*—Christie, Parker and Hale

[57] ABSTRACT

A production process for equipping a rough casting with a plurality of highly accurate surfaces at precisely predetermined locations on the casting without machining the casting. The casting includes a plurality of laterally spaced holes and is placed on a tool which supports a plurality of mounting bosses in the holes of the casting. The tool locates the bosses generally coaxial with the holes so that annular spaces are provided between the exterior of the bosses and the walls of the holes, which spaces are then filled with a bonding agent to secure the bosses to the casting. The tool positions selected faces of the bosses in desired relation to each other, preferably parallel to a reference surface defined by the tool. The tool seals an end of each annular space to prevent the bonding agent from flowing from the space as the agent cures. The tool comprises a rigid base such as, for example, granite on which are mounted fittings, each of which has a surface in a precisely predetermined position, and in a preferred embodiment the precisely positioned surfaces are in a common plane or a pair of parallel common planes. Each of these fittings receives one of the mounting bosses in engaging relation with the precisely positioned surface, and resiliently biases a seal around the mounting boss to seal the fluid bonding agent within the annular space.

10 Claims, 7 Drawing Figures

INVENTORS.
JAMES E. BLUM
ROBERT P. JOHNSON
BY
Christie, Parker & Hale
ATTORNEYS.

INVENTORS.
JAMES E. BLUM
ROBERT P. JOHNSON
BY
Christie, Parker and Hale
ATTORNEYS.

PRECISION POSITIONING TOOL

This is a division of U.S. Pat. application Ser. No. 680,830, now U.S. Pat. No. 3,575,366.

FIELD OF THE INVENTION

This invention pertains to a manufacturing tool with which a rough casting is provided with a plurality of precision reference surfaces and, more particularly, to a volume production manufacturing tool wherein a plurality of detail structural features are precisely positioned on a dimensionally stable base so that the precise positions are transferable to inserts into a rough casting.

BACKGROUND OF THE INVENTION

State of the Prior Art

Tape transports for use in digital data-processing systems are highly precise mechanisms. Such precision is required so that a given reel of magnetic recording tape may be used with absolute interchangeability in any one of a number of instruments in the system. It is not at all uncommon, particularly in modern industrial and research enterprises as well as in business enterprises of a less technologically oriented nature, that information is recorded onto a reel of magnetic recording tape at one location and read from the tape by different apparatus at a geographically different location.

Modern recording techniques feature high-information packing densities and multiple, closely spaced recording tracks on a common strip of recording tape. In order that the tape may be used with the desired interchangeability in any number of tape handling transports which may be widely separated in geography, it is necessary that the transports be as identical as possible. Otherwise, information recorded by use of one tape transport may be inaccurately read from the tape on a different transport. Accordingly, tape transports for use in digital and analog data recording systems must be very precise instruments. The precision required in a tape transport is particularly significant with respect to the location and positioning of record and read heads, to the tape supply and tape takeup reels, and to the tape drive mechanisms.

In the past, magnetic tape transports have utilized heavy base castings, the castings necessarily being heavy to render the performance of the transport as uniform as possible notwithstanding variations in temperature and humidity of the surrounding atmosphere. According to prior manufacturing techniques, it has been the practice to machine into the casting desired holes and surfaces by which other elements of the transport are secured to the casting, such other elements typically including the reading and writing transducers and the tape transport drive motors. It is extremely difficult, however, to produce a precisely machined casting at low cost by use of the techniques heretofore relied upon.

It is well known, particularly in castings which have some portion substantially thicker than other portions, that internal stresses develop in the casting as the material of the casting cools. These locked-in stresses cause severe problems in precisely machining the casting. In the machining process, removal of the skin of the casting releases some portion of the stresses locked into the casting and causes the casting to distort. If a surface or hole being machined into the casting is to be precisely positioned relative to another hole or surface deformation of the casting during and as a result of the machining process interferes with the desired precision positional relationship. Accordingly, it is necessary in precision machining a casting to first heat treat the casting to remove as many of the locked-in stresses as possible, and then to exercise great care in machining the casting to prevent the generation of further stresses within the casting. If very precise dimensional relations are to be obtained in the final machined part, it is often necessary to subject the casting to repeated heat treatment and partial machining processes until the final machining process has been completed. Even then, it is common that the last stage of the fabrication process involve hand finishing operations upon the casting. Each step in the fabrication process entails a detailed inspection. Obviously, therefore, precision machining of castings, such as cast baseplates of magnetic tape transports, is an expensive and time-consuming process.

This invention provides a manufacturing technique whereby baseplates for magnetic tape transports, for example, may be provided inexpensively and rapidly by personnel of relatively moderate skill. The precision obtained in the practice of this invention is at least as great, and can be far greater than, that obtained by adherence to techniques previously followed.

SUMMARY OF THE INVENTION

Generally speaking, this invention provides a method of fitting a rough casting with a plurality of detail structural features at precisely predetermined locations relative to each other on the casting. A tool having a dimensionally stable base and defining a reference surface is employed. A plurality of fixtures are mounted on the reference surface and are arranged in the predetermined relation to each other. The fixtures are configured to receive and to position selected bushings or mounting bosses, defining the desired detail features in a precisely predetermined arrangement corresponding to the arrangement of the predetermined locations of the detail features desired in the finished part.

In a preferred embodiment the fixtures each have a surface arranged so that the surfaces collectively define a common plane whereby inserted mounting bosses for a magnetic tape transport are precisely aligned.

Preferably, the tool used in the procedure outline above has a major portion thereof formed of granite or the like to have extreme dimensional stability.

BRIEF DESCRIPTION OF THE DRAWINGS

The above-mentioned and other features of the invention are more fully set forth in the following detailed description of presently preferred embodiments of the invention, which description is presented with reference to the accompanying drawings, wherein.

DESCRIPTION OF THE PREFERRED EMBODIMENTS

Figure 4:
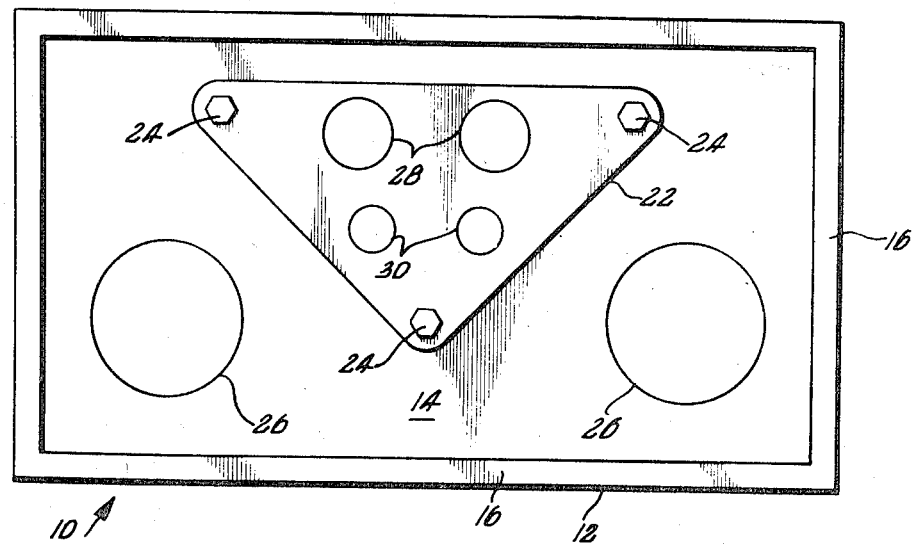
FIG. 4 is a front elevational view of a magnetic tape transport base provided with a precision plate, and fabricated in accordance with the present invention.
Figure 5:
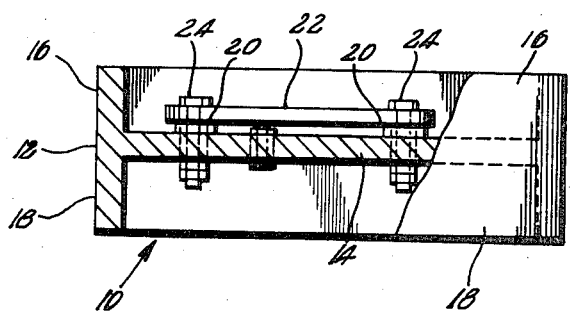
FIG. 5 is a side elevational view, with parts broken away, of the transport base shown in FIG. 4.

FIGS. 4 and 5 show a base 10 for a magnetic tape transport with reference to which the present invention is described. A magnetic tape transport is illustrative of a particular application of this invention and is referred to merely as a vehicle for explaining the invention. It should be understood that this invention can be practiced with any member which is to be fitted with a plurality of precisely positioned detail structural features. The accompanying drawings have been simplified for the purposes of clarity and ready understanding. The transport base is actually considerably more complex than suggested by FIGS. 4 and 5, for example. It should be understood therefore that the features described below and illustrated occur or are used in other areas of the base, as adjacent base openings 26, for example.

The base is defined by a casting 12 having a web 14 and flanges 16 and 18 extending away from the web substantially transverse thereto in opposing directions adjacent the periphery of the web. A plurality of coplanar precision mounting surfaces 20 support a precision plate 22 which is secured to the casting by means of bolts 24. The web is provided with a pair of laterally spaced cutouts 26 through which drive motor shafts for the tape reels of the tape transport project. The precision plate 22 is preferably constructed of glass to provide dimensional stability and includes suitable cutouts 28 and 30 which receive transducers (not shown) and tape drive capstans (not shown) of the transport.

Precision tape recorders, such as tape recorders used in conjunction with data-processing equipment, require utmost precision and accuracy in positioning the precision plate 22, especially relative to the tape reel drive motors. The positions of mounting surfaces 20, therefore, must be exact. For example, in some applications the mounting surfaces must be coplanar with respect to each other within a maximum tolerance of no more than 50 millionths of an inch. If the mounting surfaces were machined on a metal casting, such accuracy is most difficult to achieve and maintain and represents a substantial portion of the cost of manufacture of base 10.

Figure 1:
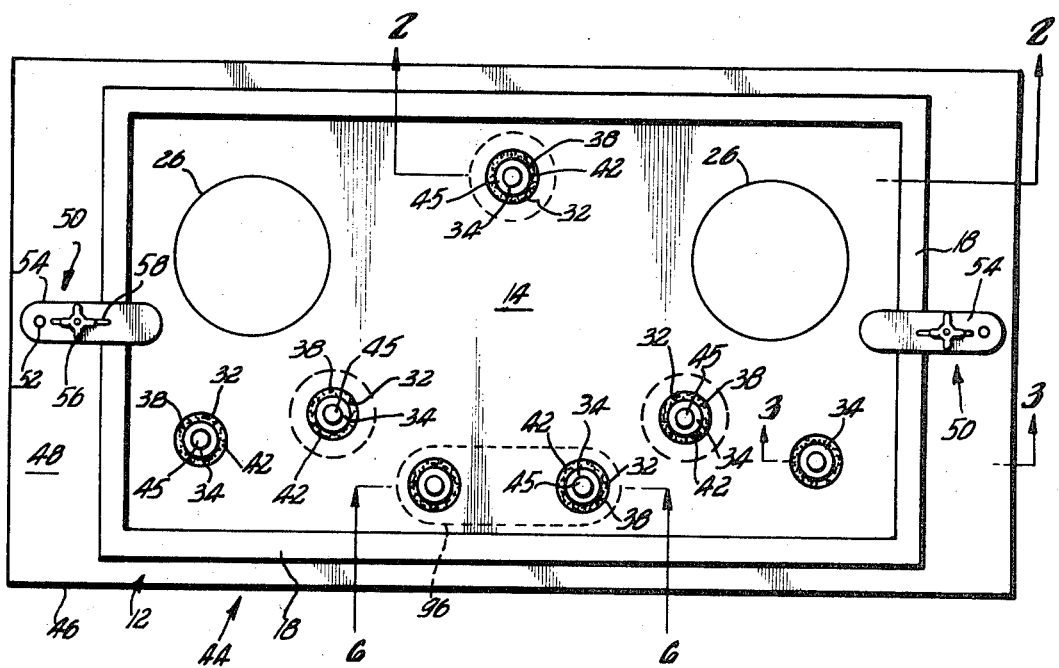
FIG. 1 is a plan view of a tool, with casting mounted thereon, used for practicing the method of this invention.

To reduce heretofore high manufacturing costs, casting 12 is provided with a plurality of laterally spaced holes 32 disposed in web 14, as shown in FIG. 1, which receive a plurality of preferably cylindrical mounting bushings 34, also known as bosses, having planar faces 36 (FIG. 3) which are substantially transverse to axes of the bosses and which define the precision mounting surfaces 20 of the casting. The bosses have diameters which are less than the diameters of the corresponding casting holes such that an annular gap 38 is produced intermediate the periphery of the bosses and walls 40 of the holes. These gaps are filled with a bonding agent 42 which rigidly secures the bosses to the web of the casting 12. The faces 36 of the bosses are accurately positioned relative to the base casting in a common plane by a plurality of fixtures 43 mounted on a tool 44.

The bosses are low-cost, mass-produced screw machine parts which are adapted to fit their particular application. Thus, they can be provided with an aperture 45, which can be threaded to engage a threaded bolt (not shown), or it may be manufactured smooth to receive a shaft (not shown). Alternatively, the aperture can have another configuration or the boss can be solid (not shown) to serve merely as a shoulder on the finished base 10.

Figure 2:
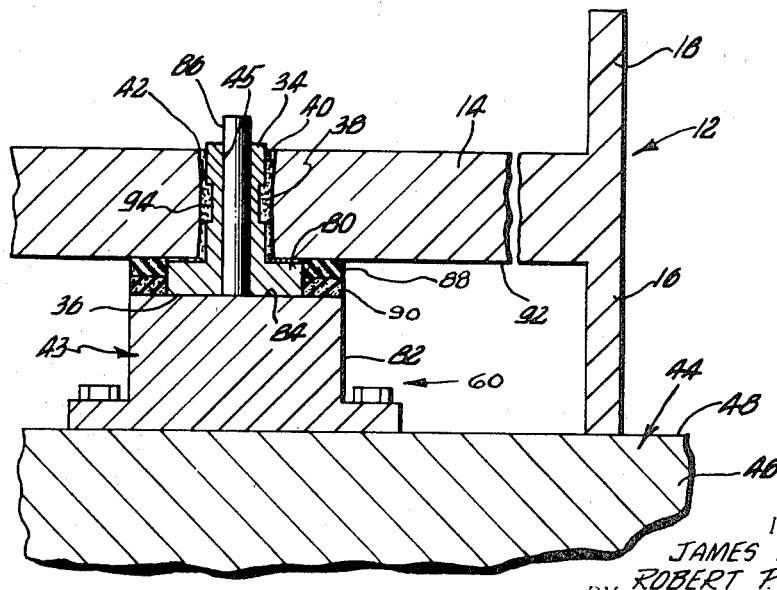
FIG. 2 is a fragmentary front elevational view, in section, taken along line 2—2 of FIG. 1.
Figure 3:
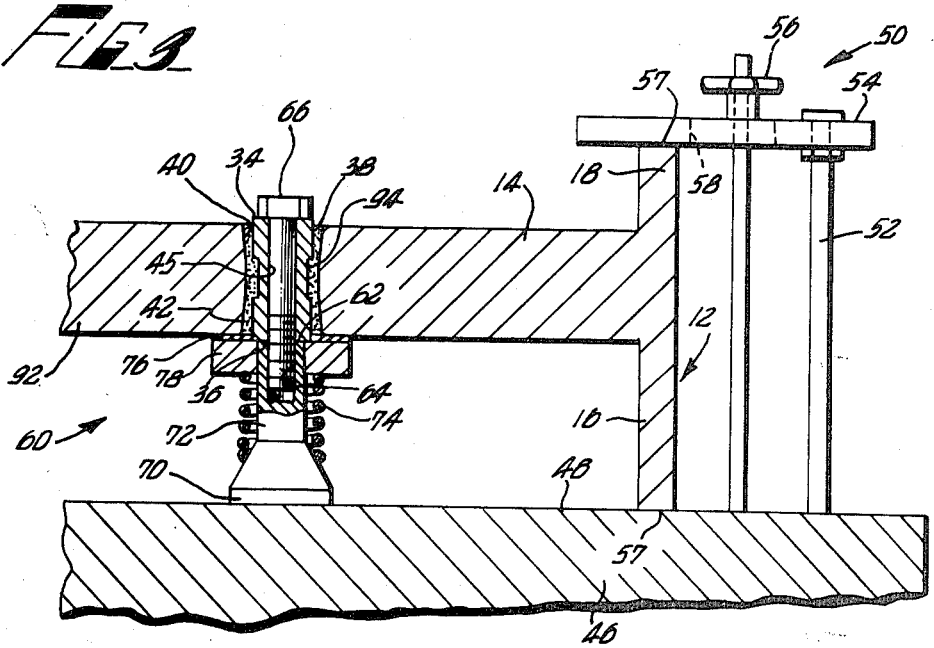
FIG. 3 is a fragmentary front elevational view, in section, taken along line 3—3 of FIG. 1.

Referring now to FIGS. 1-3, the tool 44 is shown to comprise a baseplate 46 which defines a flat reference plane 48 and which is constructed of a material which affords dimensional stability under temperature variations. Preferably, the tool baseplate is constructed of a commercially available granite block which is precision ground to provide the flat plane. Each of a plurality of base-holding clamp assemblies 50 includes a support post 52 which pivotally mounts a holding plate 54. A thumbscrew 56 extends through a slot 58 in the holding plate and permits the holding plate to be tightened against flange 18 of transport base 10 when the transport base is disposed on the flat reference plane of the tool. The edge surfaces 57 of the transport base flanges are ground planar and parallel to each other; such a grinding operation can be performed readily and economically to the desired degree of precision on a Blanchard grinder, for example.

A plurality of pedestals 60 are secured to the flat plane 48 of the tool base to define portions of fittings 43. Preferably, the pedestals are made of meehanite for dimensional stability. The pedestals are arranged on the baseplate 46 such that one pedestal is disposed adjacent each hole 32 of the transport base which is to receive a mounting boss 34. The distance between plane 48 and a face 62, defining the end of the pedestal remote from the tool base, is maintained with exactness to position the faces of the pedestals coplanar relative to each other or in some other desired precise relation. The pedestals further define upwardly open, internally threaded holes 64 for receiving bolts 66 disposed in axial apertures 45 of the cylindrical mounting bosses 34 to secure the bosses to the pedestals so that each boss face 36 is abutted against the adjacent pedestal face 62.

In a preferred embodiment of this invention, the pedestals include a relatively wide foot 70, a face of which proximate plane 48 is permanently and securely bonded to the plane, and a cylindrical portion 72 adjacent the end of the pedestal defining face 62. Disposed about the cylindrical portion and supported by the foot of the pedestal is a helical compression spring 74, a substantially circular and flexible washer 76 made of silicone rubber sheet, for example, and a spongy buffer 78. The buffer has a configuration similar to that of the washer, and is disposed intermediate the washer and the end of the spring remote from the foot of the pedestal. The spring thereby biases the washer and the buffer away from baseplate 46 and toward web 14 of casting 12.

In another embodiment of the present invention, shown in FIG. 2, the cylindrical mounting boss 34 includes a flange 80 which defines the face 36 of the boss which is to be accurately positioned and which defines the detail feature to be imparted to casting 12. In this embodiment, the fitting can be a block 82 projecting away from tool reference plane 48 and defining a positioning surface 84 which mates with face 36 of boss flange 80. The block mounts an arbor 86, preferably of the expanding type, which extends normal to plane 48 and engages the axial aperture 45 in the boss to precisely locate the boss on the mounting block 82. The arbors may be used to advantage where the axis of boss aperture 45 is to be located with precision. Adjacent the periphery of flange 80 is a flexible annular washer 88 and an annular buffer 90 constructed of a spongy and flexible material such as polyurethane foam. The washer has an inner diameter slightly less than the outer diameter of the flange 80 and is biased in a direction away from block 82 by the buffer.

To fit the tape transport base with a plurality of precision mounting surfaces 20, the mounting bosses 34 are secured to the pedestals 60 by bolts 66, and to blocks 82 by expanding arbors 86, and surfaces 36 of the various bosses are tightly pressed against the respective pedestal surfaces 62 and 84. The transport base casting is placed on surface 48 of the tool such that the ground ends of flanges 16 engage the planar reference surface of the tool. The position of the casting is adjusted until all mounting bosses 34 are disposed in the corresponding holes 32 in web 14 substantially coaxial with the holes. Thereafter the clamping assembly thumbscrews 56 are tightened to bias the holding plates 54 toward the ends of flanges 18 to substantially immovably secure the casting to the tool. The faces 36 of the mounting bosses are now accurately positioned with respect to each other since they are securely held against the positioning surfaces of the pedestals or the mounting blocks 60 or 82, respectively. Boss faces 36 define the detail structural features of interest, and these features are arranged in a precisely predetermined relation to each other.

Upon completion of the casting mounting procedure described above, washers 76 are biased towards the adjacent face 92 of casting web 14 by compression springs 74 or by spongy buffers 90. A seal is thereby established across the lower end of each annular space 38 from walls 40 of holes 32 to the periphery of the mounting bosses 34 adjacent the lower ends of the bosses. To prevent the transmission of excessive forces from the springs and buffers to the web, which forces might deflect the web when it is secured to the baseplate by holding plates 54, and thereby counteract the advantages provided by the invention, the bias on each washer is kept as small as possible consistent with the requirement that the washer form a liquidtight seal between the adjacent boss and the casting. If the web of the casting is deflected as the casting is secured to the tool, the web will resume its undeflected state upon subsequent removal from the tool, thereby moving boss surfaces 36 out of the desired precisely predetermined relation defined by the tool, the bosses being securely bonded to the casting when the casting is removed from the tool.

After the casting has been positioned and clamped down on the tool, the bonding agent 42 is introduced into the annular gaps 38 between the bosses and the casting. The bonding agent is allowed to cure until it has hardened sufficiently to rigidly fix the bosses to the casting. Thereafter, the clamping assembly thumbscrews are loosened and the casting is removed from tool 44. The faces 36 of the mounting bosses are aligned with an exactness which exactly reflects the precision of tool 44. The composite structure which is removed from the tool has the desired detail structural features thereof exactly related to each other according to a precisely predetermined arrangement.

The procedure described enables the manufacture of tape transport bases having precision mounting surfaces oriented with no appreciable tolerance variations in any one base or between different bases manufactured on the fixture. Manufacturing costs of the transport base are substantially less than when a casting is machined to provide it with precision mounting surfaces.

There are many commercially available bonding agents which can be utilized in the practice of the method of this invention. One bonding agent particularly well adapted for use in practicing this invention is sold under the trade name "Devcon" and is manufactured by the Devcon Corporation of Danvers, Mass. This bonding agent is a "plastic metal" comprising approximately 80 percent of metal powder and 20 percent of an extremely strong plastic resin. It exhibits excellent adherence to metals, is nonvolatile, and does not shrink as it cures to a hardness comparable to that of metal. If desired, the metal contained in the bonding agent may be the same metal of which the casting 12 is constructed so that the composite structure provided by the above-described procedure has as uniform physical properties as possible. Also, the mounting bosses may be made of the same material as casting 12.

To strengthen the bond and prevent axial movements of a mounting boss relative to casting 12 because of insufficient adherence of the bonding agent to the mounting boss or the web of the casting, the holes 32 preferably are flared outwardly from the center of the hole toward each end as shown in both FIGS. 2 and 3, i.e., the holes have double draft. When an axial force is applied to the mounting boss, the hardened bonding agent is then mechanically restrained from breaking loose from the walls 40 of the holes 32. For the same reasons the peripheries of the mounting bosses are preferably provided with peripheral recesses 94 which are filled by the bonding agent to mechanically prevent axial movements of the mounting boss 34 relative to the bonding agent 42 and the hole 32 in web 14.

Figure 6:
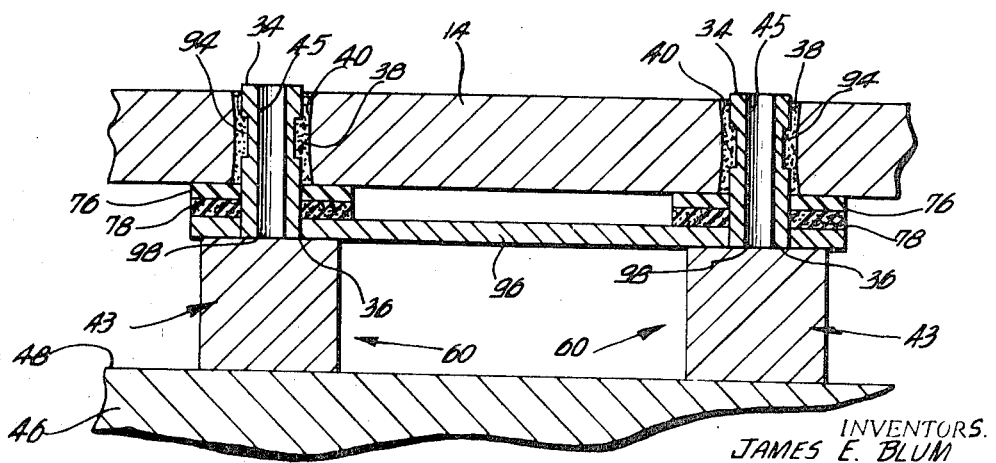
FIG. 6 is a fragmentary front elevational view, in section, taken along lines 6—6 of FIG. 1.

Referring to FIGS. 1 and 6, the tool 44 is shown to include a precision lateral spacer plate 96 having a plurality of apertures 98 for receiving the peripheries of several mounting bosses 34 to accurately position the mounting bosses precisely laterally relative to each other. The sponge buffers and sealing washers are disposed between the spacer plate and the casting around the bosses engaged by the spacer plate. Use of the spacer plate makes it possible not only to accurately locate the mounting bosses in an axial direction, such function being accomplished by fixtures 43, but also to accurately locate them precisely relative to each other in directions parallel to surface 48. In applications where high lateral spacing accuracy is not required, the spacer plate need not be used.

As noted above, mounting bosses 34 are provided at more locations of transport base 10 than are shown in the drawings. Bosses are provided in the casting adjacent casting openings 26 for mounting the drive motors for the tape reels of the transport, and these bosses have coplanar surfaces 36 adjacent the rear face of the base casting. The reel drive motors are then screwed to the bosses, the aligned surfaces of the bosses defining reference mounting surfaces for the motors. These reference surfaces may be primary reference surfaces for the transport.

Figure 7:
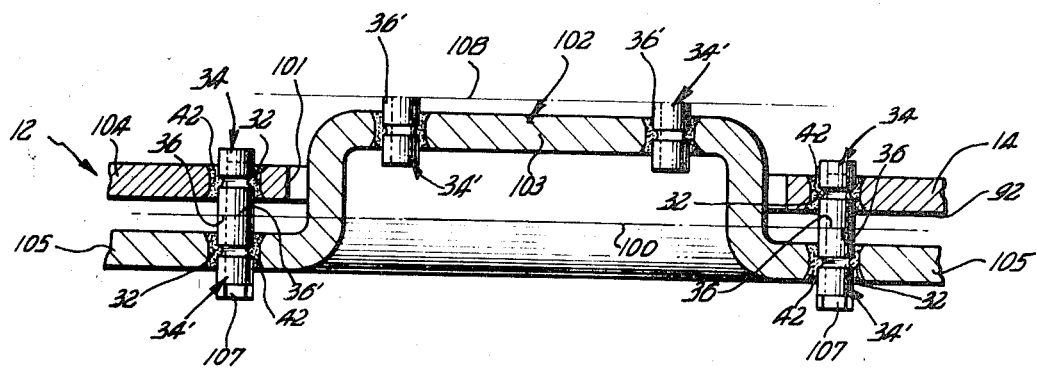
FIG. 7 is a cross section elevation view of a pair of castings fabricated by the present method.

The manufacturing procedures described above locate detailed structural features of the tape transport base, for example, relative to one face of the base casting. It may be desirable however, especially with reference to precision plate 22, to have a secondary reference plane associated with the other face of the casting in the finished or nearly finished transport. FIG. 7 illustrates how this invention may be used to provide a secondary reference plane located on the side of the casting opposite from the primary reference plane and having a precisely predetermined relation, such as exact parallelism, to the primary reference plane.

As shown in FIG. 7, a plurality of mounting bosses 34 are bonded to casting 12, by the procedure described above, adjacent a large opening 101 formed in casting web 14. These bosses have end surfaces 36 which are disposed adjacent web rear surface 92 in coplanar relation to define a primary reference plane 100. A secondary casting 102 has a central portion 103 disposed in opening 101 to be adjacent front face 104 of the web of casting 12. The secondary casting has a peripheral flange 105 which extends laterally of opening 101 adjacent the rear face of casting 12. Both the peripheral flanges and the central portion of the secondary casting carry bonded-in-place, axially bored mounting bosses 34' having flat locating end faces 36'.

The bosses mounted in the secondary casting are assembled into this casting by a procedure in accord with that described above, it being understood that the secondary casting has it own tool similar to tool 44. Boss surfaces 36' are all disposed parallel to each other, those associated with the peripheral flanges of the secondary casting being coplanar and those associated with the central portion of the casting being coplanar, such planes being parallel to each other. It will be observed that all bosses 34' are located with reference to a front face 106 of the secondary casting. The secondary casting is inverted on its tool for location of bosses 34' therein. Those bosses 34' which are carried by the flange of the secondary casting are located laterally of each other in correspondence with the pattern of those bosses 34 lying adjacent opening 101 in casting 12.

After the bosses have been secured in the secondary casting, the casting is mated with casting 12 so that the secondary casting flange bosses mate with the corresponding bosses of the principal casting, and the two castings are secured together by bolts 107 engaged with the aligned mounting bosses. The result is a composite structure which has a primary reference plane 100 adjacent the rear face of casting 12 and a precisely parallel secondary reference plane 108 adjacent the front face of casting 12, the secondary reference plane being defined by surfaces 36' of the bosses carried in the central portion of the secondary casting. The precision plate of the tape transport conveniently may be mounted to the secondary casting.

By the use of suitable mounting bosses and appropriately configured tools, substantially any desired detail structural features having precisely determined interrelations may be imparted to a casting without appreciable machining of the casting. The bosses can be produced rapidly and inexpensively with great precision on screw machines, turret lathes, and other machine tools. Tools like tool 44 can be reused an indefinite number of times for volume production purposes to produce inexpensive composite structures which are exact duplicates of each other. The time-consuming and costly machining, inspection and heat-treating procedures which are encountered in producing large precision machined castings by conventional techniques are avoided by practice of the production method described above.

The foregoing description has presented this invention in the context of the production manufacture of a major component of a tape transport merely for the purposes of example in furtherance of the explanation of a presently preferred embodiment of the invention. It should be understood that the method and apparatus described above can be used to advantage in the volume manufacture of different precision members and parts. It should also be understood that the apparatus and procedures described can be modified without departing from the scope of this invention. Accordingly, the foregoing is not to be taken as limiting the scope of the invention defined in the following claims.

What is claimed is:

1. A tool for use in the volume production of baseplates for magnetic tape transports, which baseplates consist basically of essentially unmachined castings having precision detail features therein at precisely predetermined locations thereof, the casting having cast therein holes at positions corresponding generally to the locations of the detail features of the finished part, the casting including a machined reference plane which is essentially the only machined surface on the casting itself, said tool comprising a dimensionally stable base having a reference plane for mating with the casting reference plane, a plurality of pedestal fittings mounted on the tool reference plane and extending upwardly therefrom, the pedestal fittings being arranged on the tool reference plane in an array corresponding to the arrangement of the holes in the casting and defining precision locating means for respective ones of a corresponding plurality of precision insert elements defining corresponding detail features of the finished transport baseplate, at least a plurality of the fittings including a plane surface spaced apart from the reference plane and parallel thereto, means for securing the insert elements to the fittings each with a plane face in engagement with the plane surface of the respective fitting so that said detail features defined by the insert elements occupy precisely the same relation to each other in the tool as the detail features of the finished transport baseplate occupy to each other, including a plane parallel to and spaced apart from the machined reference plane and means for clamping the casting to the tool base with the casting and tool reference surfaces engaged and with the insert elements secured to the fittings disposed in the casting holes in spaced relation to the holes.

2. A tool according to claim 1 wherein the tool base is fabricated of granite and the pedestal fittings are fabricated principally of meehanite.

3. A tool for use in the volume production of baseplates for magnetic tape transports, which baseplates consist basically of essentially unmachined castings having precision detail features therein at precisely predetermined locations thereof, the casting having cast therein holes at positions corresponding generally to the locations of the detail features of the finished part, the casting defining a machined reference surface which is essentially the only machined surface on the casting itself, said tool comprising a dimensionally stable base having a reference surface for mating with the casting reference surface, a plurality of pedestal fittings mounted on the tool reference surface and extending upwardly therefrom, the pedestal fittings being arranged on the tool reference surface in an array corresponding to the arrangement of the holes in the casting and defining precision locating means for respective ones of a corresponding plurality of precision insert elements defining corresponding detail features of the finished transport baseplate, means for securing the insert elements to the fittings so that said detail features defined by the insert elements occupy precisely the same relation to each other in the tool as the detail features of the finished transport baseplate occupy to each other, means for clamping the casting to the tool base with the casting and tool reference surfaces engaged and with the insert elements secured to the fittings disposed in the casting holes in spaced relation to the holes, and a rubber washer having an outer diameter greater than the adjacent diameter of the corresponding casting hole associated therewith and an inner diameter less than the diameter of the insert element associated therewith for sealing the lower limits of spaces defined between a casting clamped to the base and insert elements secured to the fittings.

4. A tool according to claim 3 including means for biasing the washer into engagement with a casting clamped to the tool about the periphery of the corresponding casting hole.

5. A tool according to claim 4 wherein the biasing means includes a resilient foam pad engaged between the washer and the corresponding fitting.

6. A tool according to claim 5 wherein the biasing means includes a spring engaged between the pad and the fitting for urging the pad away from the tool reference surface.

7. A precision positioning tool for a magnetic tape transport baseplate comprising:
a dimensionally stable base having a reference plane;
a plurality of mounting fixtures arrayed on the reference plane and extending thereabove; each of the mounting fixtures having a plane surface precisely positioned parallel to the reference plane, and means for temporarily receiving an insert element having a plane face mounted in engagement with the plane surface so that the insert element is precisely positioned parallel to the reference plane; and
means for temporarily fastening a magnetic tape transport baseplate onto the base with a baseplate reference plane in engagement with the base reference plane and with openings aligned with the mounting fixtures.

8. A tool as defined in claim 7 wherein another plurality of plane surfaces on mounting fixtures are in a third plane parallel to the first plane.

9. A tool as defined in claim 7 wherein each mounting fixture further comprises means for sealing a region adjacent an insert element on the fixture.

10. A precision positioning tool for a magnetic tape transport baseplate comprising:
a dimensionally stable base having a reference surface;
a plurality of mounting fixtures arrayed on the reference surface and extending thereabove; each of the mounting fixtures having a surface portion precisely positioned in relation to the reference surface, and means for temporarily receiving an insert element mounted in engagement with the surface portion so that the insert element is precisely positioned in relation to the reference surface; and
means for temporarily fastening a magnetic tape transport baseplate onto the base with a baseplate reference surface in engagement with the base reference surface and with openings aligned with the mounting fixtures and wherein each mounting fixture comprises:
washer means for engaging a magnetic tape transport baseplate mounted on the base, and
resilient means between the washer means and the respective mounting fixture for resiliently biasing the washer away from the fixture surface portion for sealing a region adjacent an insert element on the fixture.

* * * * *